United States Patent [19]

Bidanset

[11] Patent Number: 4,838,909
[45] Date of Patent: Jun. 13, 1989

[54] CARTRIDGE AIR FILTER AND METHOD OF MAKING THE SAME

[75] Inventor: Edward J. Bidanset, Charlotte, N.C.

[73] Assignee: Textron, Inc., Providence, R.I.

[21] Appl. No.: 241,075

[22] Filed: Sep. 6, 1988

[51] Int. Cl.$^4$ .......................................... F02M 17/34
[52] U.S. Cl. ........................... 55/385.7; 55/DIG. 28; 55/419; 55/497
[58] Field of Search ................. 55/DIG. 28, 419, 497, 55/510, 385.1, 385.7

[56] References Cited

U.S. PATENT DOCUMENTS

| | | | |
|---|---|---|---|
| 1,105,090 | 7/1914 | Metzer | 261/64.6 |
| 1,580,268 | 4/1926 | Pajalic | 55/DIG. 28 |
| 1,885,331 | 11/1932 | Collins | 261/64.3 |
| 1,968,553 | 7/1934 | Heitger | 261/39.3 |
| 2,717,150 | 9/1955 | Agar | 261/64.6 |
| 3,224,174 | 12/1965 | Erbstoesser | 55/DIG. 28 |
| 3,347,028 | 10/1967 | Erbstoesser | 55/510 |
| 3,353,341 | 11/1967 | Stripp | 55/510 |
| 3,355,863 | 12/1967 | Pittsley | 55/510 |
| 3,382,853 | 5/1968 | Kinoshita | 123/73 |
| 3,589,108 | 6/1971 | Dingel et al. | 55/510 |
| 3,670,480 | 6/1972 | Petersen | 55/DIG. 28 |
| 3,746,320 | 7/1973 | Van Camp et al. | 261/35 |
| 3,811,417 | 5/1974 | Keenan et al. | 123/73 A |
| 3,849,093 | 11/1984 | Konishi et al. | 55/DIG. 28 |
| 3,852,377 | 12/1974 | Heintzelman et al. | 261/1 |
| 3,856,490 | 12/1974 | Heintzelman | 55/420 |
| 4,366,104 | 12/1982 | Miller | 261/18 A |
| 4,495,911 | 1/1985 | Andreasson | 123/198 R |
| 4,539,162 | 9/1985 | Ferrell | 261/1 |
| 4,600,418 | 7/1986 | Gommel et al. | 55/462 |
| 4,648,474 | 3/1987 | Shinozaki et al. | 180/219 |
| 4,691,681 | 9/1987 | Hoppner et al. | 123/556 |

FOREIGN PATENT DOCUMENTS 65546 12/1982 European Pat. Off. .

OTHER PUBLICATIONS

Homelite Parts List for Models 290 and 340 Chain Saws; p. 6., part No. 17867.
Jonsered Spare Parts List for Model 590 Chain Saw; 1987; p. 4.
Copy of photographs of Jonsered Chain Saw Air Filter and Movable Choke.

Primary Examiner—Tim Miles
Attorney, Agent, or Firm—Perman & Green

[57] ABSTRACT

A cartridge air filter for use with an internal combustion engine and method of making the air filter. The air filter comprises a fuel spitback shield having means for collecting spitback fuel from a carburetor and means for substantially containing collected fuel spitback with the collecting means for re-injection into the engine.

18 Claims, 2 Drawing Sheets

CARTRIDGE AIR FILTER AND METHOD OF MAKING THE SAME

BACKGROUND OF THE INVENTION

1. Field of the Invention

This invention relates to internal combustion engines and, more particularly, to an air filter for use with internal combustion engines.

2. Prior Art

Various different types of choke valves and spitback shields are known in the internal combustion engine art. In U.S. Pat. No. 4,495,911 to Andreasson, a choke device located in the air filter of an internal combustion engine is disclosed. U.S. Pat. No. 1,105,090 discloses an air valve for carburetors. U.S. Pat. No. 4,539,162 discloses a choke assembly for a golf cart. U.S. Pat. No. 3,746,320 discloses a fuel feed and charge forming method and apparatus with an inlet region having a choke band of a venturi-like shape.

However, various different problems still exist with presently available devices. First, it is desirous to substantially reduce or eliminate contamination of the filter elements in the air filter by fuel which is spitback from the carburetor. Spitback can generally be described as the ejection of fuel particles out of the carburetor air intake into the air filter. Spitback can contaminate the air filter element causing dust particles and the like to become caked on the filter elements and thereby clog the filter elements and prevent a proper air-fuel mixture from being obtained. Second, in some situations, it is desirous to provide components as small or compact as possible such as for reduction in the size and weight of the engine. This is particularly important for hand held devices such as chain saws or grass trimmers. Third, it is desirous to provide an air filter for an engine that is a cartridge type air filter for easy removal or replacement.

A problem exists in the prior art in that, although spitback shields are known in the art and may be able to accelerate inlet air velocity proximate these shields, no spitback shield has provided both a fuel accumulation surface as well as means for containing accumulated fuel spitback with the shield for re-injection into the carburetor. This problem is clearly evident during conditions of severe or prolonged fuel spitback when the rate of fuel spitback is greater than the rate of re-injection of the fuel into the carburetor. This can result in large amounts of fuel spitback accumulating on the shield to such a degree that the fuel can drip or vibrate off of the shield and onto the filter elements.

A further problem exists in the air filters of the prior art in that no air filter is provided that can collect spitback fuel, contain the collected spitback fuel and allow for the atomization and re-injection of the contained fuel spitback fuel into the carburetor of an engine.

It is therefore an objective of the present invention to provide an improved fuel spitback shield for use in an air filter that can contain relatively large amounts of accumulated spitback fuel.

It is a further objective of the present invention to provide an improved fuel spitback shield which is space efficient and has means for both collecting and containing spitback fuel.

It is a further objective of the present invention to provide an improved cartridge air filter having a spitback shield and fuel spitback atomizer.

SUMMARY OF THE INVENTION

The foregoing problems are overcome and other advantages are provided by a shield for use in an air filter for an internal combustion engine.

In accordance with one embodiment of the invention, the shield comprises a means for collecting spitback fuel having a surface means with a projecting portion and means for substantially containing spitback fuel with the collecting means for re-injection into the engine. The containing means comprises the surface means having a relatively recessed portion for holding spitback fuel therein and the projecting portion being cooperateable with a carburetor aperture of the air filter to accelerate air velocity and atomize spitback fuel on said collector means.

In accordance with another embodiment of the invention, an air filter is provided comprising frame means having carburetor aperture means for allowing inlet air to enter the carburetor; filter means; and shield means comprising collector means and means for increasing velocity of inlet air for atomizing accumulated spitback fuel for re-injection into the carburetor.

In accordance with one method of the invention, a method is provided for manufacturing an air filter comprising the steps of forming a filter frame comprising a filter base and a filter top, the filter base having an inlet pipe projecting into the filter frame, the filter top having a collector surface positionable opposite the inlet pipe, the collector surface having a projecting cone positionable at least partially in the pipe for providing a reduced cross-sectional flow path; connecting a filter means with the filter frame; and connecting the filter base with the filter top such that the collector surface can collect spitback fuel and the reduced cross-sectional flow path can accelerate inlet air velocity to atomize the collected spitback fuel.

BRIEF DESCRIPTION OF THE DRAWINGS

The foregoing aspects and other features of the invention are explained in the following description, taken in connection with the accompanying drawings wherein.

DETAILED DESCRIPTION OF THE INVENTION

Figure 1:
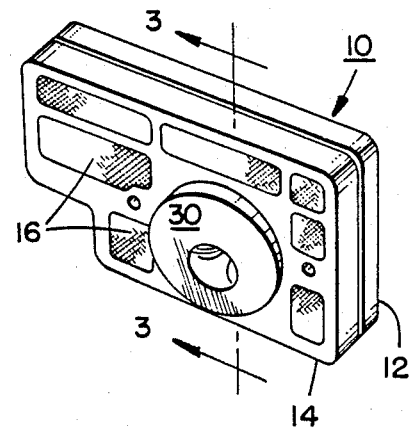
FIG. 1 is a perspective view of an air filter cartridge incorporating features of the invention.

Referring to FIG. 1, a perspective view of an air filter cartridge 10, for use with an internal combustion engine (not shown), incorporating features of the invention is shown. Although the features of the present invention will be described in detail with regard to the embodiment shown in FIG. 1, it should be understood that the present invention can be embodied in many alternate forms and is not necessarily limited to the embodiment shown in FIG. 1. In addition, it should be understood that the present invention may include any suitable size, shape or type of materials without departing from the spirit of the invention.

The air filter 10, in this embodiment, generally comprises a filter base 12 and a filter top 14. The air filter 10 is generally mounted to a carburetor (not shown) of an engine wherein incoming air, intended to be mixed with the fuel in the carburetor, is first passed through the air filter 10 which filters or removes contaminants from the inflowing air. Filter elements 16 are provided in the filter base 12 and filter top 14 for this air filtration process. The filter elements 16, in this embodiment, generally comprise screen elements. However, any suitable type of filter elements may be provided. Incoming air can generally pass through the filter elements 16 into an interior cavity or portion 18 established by the filter base 12 and filter top 14. The filtered air in the interior portion 18 can then pass through a carburetor inlet aperture 22 in the filter base 12 and travel to the carburetor for mixture with fuel.

Figure 2:
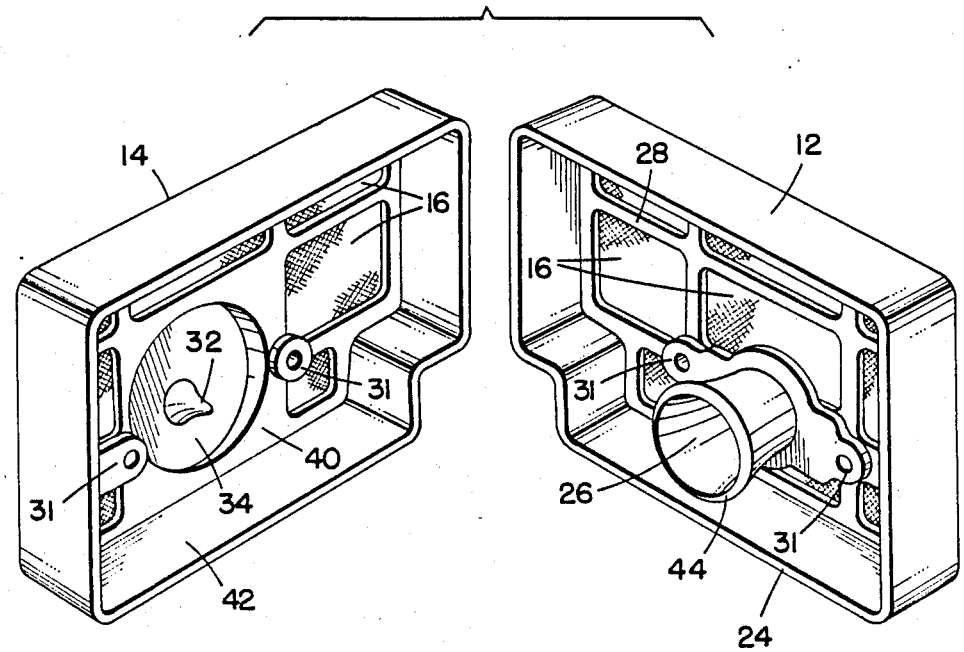
FIG. 2 is an exploded view showing the interiors of the filter base and filter cover of the air filter cartridge show in FIG. 1.
Figure 3:
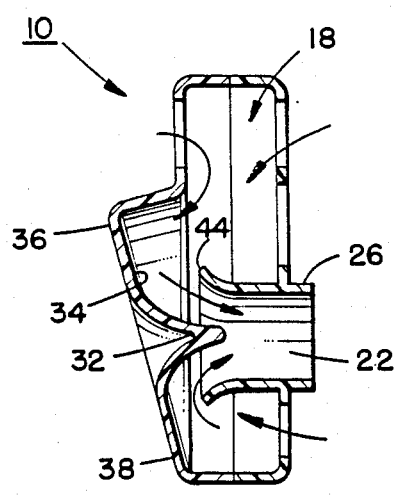
FIG. 3 is a cross-sectional view of the air filter cartridge of FIG. 1 taken along lines 3—3.

Referring also to FIGS. 2 and 3, the filter base 12, in this embodiment, generally comprises a frame 24, filter elements 16 and an inlet pipe 26 which forms the carburetor inlet aperture 22. The filter base frame 24 is generally comprised of a molded material such as a plastic or polymer material. However, any suitable material can be used. The filter elements 16, in this embodiment, are fixedly mounted to the frame 24 and structural ribs 28 of the frame 24 are provided to give form and rigidity to the filter elements 16. In this embodiment, suitable holes 31 are provided in the filter base 12 for passage of mounting means (not shown), such as bolts, for mounting the air filter 10 to the carburetor. In this embodiment, the holes 30 are located on opposite sides of the carburetor inlet aperture 22. The inlet pipe 26, in this embodiment, generally extends into the interior portion 18 of the air filter 10 and has an interior end 44 that establishes an end plane which is located in the interior 18 of the air filter 10. The filter base 12, in this embodiment, also comprises an outer profile slightly smaller than the outer profile of the filter top 14 such that the filter top 14 can be snapped onto the filter base 12 around its outer perimeter.

The filter top 14, in this embodiment, is intended to cooperatingly mate with the filter base 12 and substantially prevent air from entering the interior portion 18 of the air filter 10 except by first passing through the filter elements 16. The filter top 14 is generally comprised of a molded material such as a plastic or polymer material. However, any suitable material can be used. The filter elements 16 are generally fixedly mounted to a frame 42 of the top 14.

In an alternate embodiment of the invention, the filter elements 16 may be removable. Alternatively, the filter elements 16 may be formed integral with the filter base 12 and filter top 14. The filter top 14, also comprises a fuel spitback shield 30 formed by a wall 40 of the filter top 14. The fuel spitback shield 30, in this embodiment, generally comprises a venturi cone portion 32 and a relatively large recessed angled surface 34. The shield 30 is positionable opposite the inlet pipe 26 with a portion of the venturi cone portion 32 extending into the inlet pipe. However, any suitable shape can be provided to locally accelerate airflow velocity into the inlet pipe 26. The cone portion 32 is generally surrounded by the recessed surface 34. The recessed surface 34 is generally offset or set back from the interior 18 of the filter top 14 and, in this embodiment, is relatively angled having a relatively deep recess at a top portion 36 and a relatively shallow recess at a bottom portion 38. In an alternate embodiment of the invention the surface 34 need not be angled, but may be relatively parallel with the interior portion 18 of the filter, or may have an irregular surface or texture or may be combined with an angled or irregular interior end 44 of the inlet pipe 26.

As shown with reference to FIG. 3, when the filter top 14 is connected to the filter base 12 the interior end 44 of the inlet pipe 26 is located relatively close to the shallow bottom portion 38 of the recess surface 34 and is relatively distantly spaced from the deep recessed top portion 36 of the surface 34. In this embodiment, the air filter 10 is intended to be mounted to a carburetor such that during operation of the engine the bottom portion 38 of the recessed surface 34 is located downwardly of the top portion 36 of the surface 34. Thus orientated, in the event that a large quantity of fuel is spitback from the carburetor throughout the inlet aperture 22 onto the surface 34 and starts to accumulate as a relatively large quantity, it can be gravity fed down towards the bottom portion 38 of the surface 34 for accelerated reintroduction into the carburetor as will be described below.

In operation, the air filter 10 generally performs four functions. First, the recessed surface 34 and cone portion 32 of the shield 30 shields the filter elements 16 from fuel that is spitback from the carburetor into the air filter and act to accumulate or collect the fuel before the fuel has an opportunity to contaminate the filter elements 16. Second, the recessed surface 34 generally provides a means for the containment of accumulated or collected fuel with the shield 30. Because the surface 34 is recessed and the inlet pipe 26 extends into the interior portion 18 of the air filter, a relatively torturous path is provided to prevent spitback fuel from accessing the filter elements 16, but which nonetheless provides for a relatively accessible flow path for inlet air through the interior portion 18 of the filter and out the inlet aperture 22 towards the carburetor. Third, because the venturi cone portion 32 is provided proximate the interior end 44 of the inlet pipe 26, the cone portion 32 can locally accelerate airflow velocity proximate the interior end 44 of the inlet pipe 26. This localized accelerated velocity of airflow increases atomization of accumulated spitback fuel for re-injection into the carburetor. In other terms, the accelerated airflow velocity breaks up the accumulated spitback fuel into very small particles which can be easily carried back to the carburetor by the airflow. Fourth, because the interior end 44 of the inlet pipe 26 is located in relatively close proximity to the bottom portion 38 of the surface 34, due to the angled or inclined nature of the surface 34, a more narrow or restricted cross sectional flow path is provided proximate the bottom portion 38 where fuel accumulation or containment would be expected to be largest. This reduced cross sectional flow path allows for even greater airflow velocity proximate the bottom portion 38 thus producing a greater rate of atomization of spitback fuel proximate the bottom portion 38. The relatively fast atomization of the accumulated spitback fuel substantially prevents large amounts of fuel to accumulate and thereby aids in the containment of accumulated fuel spitback. In addition, the present invention, in the embodiment shown, is provided as a cartridge type air filter that can be readily removed or replaced.

During the operation of an engine which the air filter 10 is being used with, the fuel from the carburetor will undoubtedly exit the carburetor and enter the interior portion 18 of the air filter through the carburetor inlet aperture 22. In the event this fuel spitback exits the inlet pipe 26 it will come into contact with the recessed surface 34 or cone portion 32 of the shield 30 and adhere or accumulate thereon. The accumulated spitback fuel, due to the venturi effect or localized increased airflow velocity caused by the cone portion 32 and interior end 44 of the inlet pipe 26, is atomized by the inlet air traveling towards the carburetor inlet aperture 22 and is thereby reinjected into the carburetor. In the event that the rate of fuel spitback is greater than the rate of spitback atomization, the recessed nature of the surface 34 substantially prevents accumulated fuel from exiting the recessed area to contact the filter elements 16. In addition, the inclined nature of the surface 34 allows large quantities of accumulated fuel to travel downward towards the bottom portion 38 where the rate of atomization is the greatest thus increasing the overall rate of atomization of accumulated fuel. In an alternate embodiment of the invention the surface 34 may be inclined or angled at any desired orientation. In addition, the surface 34 may have any desired shape including a relatively hemispherical shape. The cone portion 32 may also extend from the surface 34 at any desired angle.

Figure 4:
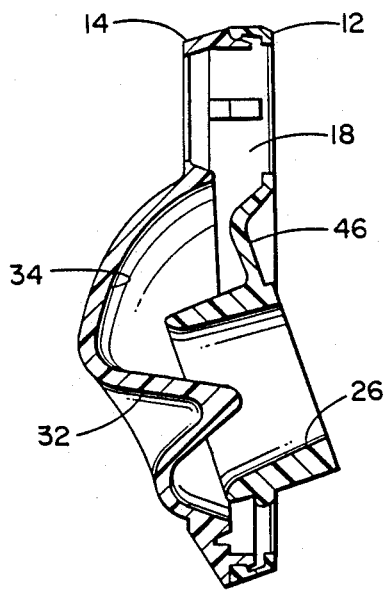
FIG. 4 is a cross-sectional view of an alternate embodiment of the invention.

Referring to FIG. 4, an alternate embodiment of the invention is shown. In this embodiment, the surface 34 is provided as a relatively hemispherical bowl. The cone portion 32 is generally located in a bottom section of the recessed surface 34 and extends upward at an angle relative to the center plane of the interior 18. The inlet pipe 26, in this embodiment, is correspondingly angled to align with the cone portion 32. The filter base 12, in this embodiment, also comprises an inwardly projecting portion 46 located above the inlet pipe 26 to accommodate attachment to a carburetor.

It should be understood that the foregoing description is only illustrative of the invention. Various alternatives and modifications can be devised by those skilled in the art without departing from the spirit of the invention. Accordingly, the present invention is intended to embrace all such alternatives, modifications and variances which fall within the scope of the appended claims.

What is claimed is:

1. A shield for use in an air filter for an interval combustion engine, the shield comprising:
   means for collecting spitback fuel having a surface means with a projecting portion and a non-projecting portion; and
   means for substantially containing spitback fuel on said surface means for re-injection into the engine, said containing means comprising said surface means non-projecting portion having a relatively recessed portion for holding spiteback fuel therein and said projecting portion being at least partially insertable into a carburetor aperture of the air filter to form a venturi to accelerate air velocity and atomize spitback fuel on said surface means for reintroduction into the engine.

2. A shield as in claim 1 wherein the shield is formed from at least a portion of a frame of the air filter.

3. A shield as in claim 1, wherein said projecting portion is generally conical.

4. A shield as in claim 1 wherein said collecting means is substantially enclosed having aperture means communicating with the interior of the air filter.

5. A shield as in claim 1 wherein said surface means comprises a relatively large surface with said projecting portion extending therefrom at a non-perpendicular angle.

6. A shield as in claim 5 wherein said relatively large surface is relatively flat and positionable at an inclined angle relative to the carburetor aperture of the air filter.

7. A shield as in claim 5 wherein said relatively large surface is relatively hemispherical.

8. An air filter for use with a carburetor of an internal combustion engine, the filter comprising:
   frame means having carburetor aperture means for allowing inlet air to enter the carburetor;
   filter means; and
   shield means comprising collector means having a surface proximate said carburetor aperture means for the accumulation of spitback fuel thereon,
   means for containing accumulated fuel on said shield means and means for increasing velocity of inlet air proximate at least a portion of said surface including a shield projecting portion projecting into said aperture means for atomizing accumulated spitback fuel for re-injection into the carburetor whereby spitback fuel is substantially prevented from contaminating said filter means.

9. An air filter as in claim 8 wherein said collector means comprises a relatively recessed surface.

10. An air filter as in claim 8 wherein said shield means comprises at least a portion of a wall of the air filter.

11. An air filter as in claim 8 wherein the air filter is disconnectable from the carburetor.

12. An air filter as in claim 8 wherein said shield means is relatively stationary relative to said frame means.

13. An air filter as in claim 8 wherein said shield projecting portion extends into said carburetor aperture means to form a reduced cross-sectional flow path between said aperture means and said projecting portion.

14. An air filter as in claim 13 wherein said extending portion is relatively conical.

15. An air filter as in claim 14 wherein said extending portion is substantially surrounded by a relatively recessed portion.

16. An air filter as in claim 8 wherein said surface is relatively inclined with said carburetor aperture means.

17. An air filter as in claim 16 wherein an inlet air flow path proximate a bottom portion of said carburetor aperture means is relatively small.

18. A method of manufacturing an air filter for use with an internal combustion engine comprising the steps of:
   forming a filter frame comprising a filter base and a filter top, said filter base having an inlet pipe projecting into said filter frame, said filter top having a collector surface positionable opposite said inlet pipe, said collector surface having a projecting cone positionable at least partially in said pipe for providing a reduced cross-sectional flow path and a relatively recessed area surrounding said projecting cone, said recessed area having a varying recess depth;
   connecting a filter means with said filter frame; and
   connecting said filter base with said filter top such that said collector surface can collect spitback fuel and said reduced cross-sectional flow path can accelerate inlet air velocity to atomize the collected spitback fuel.

* * * * *